United States Patent
Murakami et al.

(10) Patent No.: US 7,490,536 B2
(45) Date of Patent: *Feb. 17, 2009

(54) VIBRATION-SUPPRESSING CUTTING TOOL

(75) Inventors: Daisuke Murakami, Itami (JP); Norihide Kimura, Itami (JP); Junya Okida, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 456 days.

This patent is subject to a terminal disclaimer.

(21) Appl. No.: 10/994,332

(22) Filed: Nov. 23, 2004

(65) Prior Publication Data

US 2005/0109182 A1    May 26, 2005

(30) Foreign Application Priority Data

Nov. 26, 2003   (JP)   ............... 2003-395827

(51) Int. Cl.
    *B27B 33/12*   (2006.01)
(52) U.S. Cl. .......................................... 82/158; 83/835
(58) Field of Classification Search .............. 82/158, 82/157, 159; 74/574.4; 409/141; 407/66; 83/835, 839, 666, 651; *B23B 29/02*
    See application file for complete search history.

(56) References Cited

U.S. PATENT DOCUMENTS

| | | | |
|---|---|---|---|
| 2,426,359 A | | 8/1947 | Lankheet |
| 2,563,559 A | | 8/1951 | Sneva |
| 2,641,940 A | * | 6/1953 | White ........................ 408/143 |
| 2,656,742 A | | 10/1953 | Poole |
| 2,699,696 A | * | 1/1955 | Hahn ........................ 408/143 |
| 2,816,769 A | * | 12/1957 | Noble ......................... 279/83 |
| 2,842,014 A | * | 7/1958 | Miller ....................... 408/144 |
| 3,612,222 A | * | 10/1971 | Minor ........................ 188/379 |
| 3,642,378 A | | 2/1972 | Hahn et al. |
| 3,774,730 A | * | 11/1973 | Maddux ..................... 188/379 |
| 3,828,637 A | * | 8/1974 | Slack .......................... 83/348 |
| 3,838,936 A | | 10/1974 | Andreassen et al. |
| 3,841,785 A | * | 10/1974 | Werther ..................... 408/197 |
| 4,061,438 A | * | 12/1977 | New ............................ 408/143 |
| 4,553,884 A | * | 11/1985 | Fitzgerald et al. .......... 408/143 |
| 4,666,350 A | * | 5/1987 | Nicholas ..................... 408/82 |

(Continued)

FOREIGN PATENT DOCUMENTS

EP   0 812 641 A1   12/1997

(Continued)

*Primary Examiner*—Kenneth E. Peterson
*Assistant Examiner*—Sean Michalski
(74) *Attorney, Agent, or Firm*—McDermott Will & Emery LLP

(57) ABSTRACT

A holder 1 has a shank portion 2 provided with a pocket 4 having the shape of a nearly rectangular solid. The pocket 4 is placed at a position relatively close to the tip of the tool. In the cross section of the shank, the pocket 4 has a width of 50% to 100% of the shank diameter or width, a height of 20% to 50% of the shank height, and a length of 50% to 250% of the shank diameter or height. A weight 5 is inserted into the pocket 4 such that the weight is movable but unable to rush out. The weight 5 has the shape of a nearly rectangular solid and is made of a material having a specific gravity comparable to or greater than that of the material of the shank portion.

8 Claims, 8 Drawing Sheets

U.S. PATENT DOCUMENTS

| | | | |
|---|---|---|---|
| 5,135,533 A * | 8/1992 | Petersen et al. | 606/176 |
| 5,700,116 A | 12/1997 | Cobb, Jr. | |
| 6,312,201 B1 * | 11/2001 | Nagaya et al. | 409/234 |
| 6,443,673 B1 | 9/2002 | Etling et al. | |
| 6,588,310 B2 * | 7/2003 | Lee et al. | 83/835 |
| 6,619,165 B2 | 9/2003 | Perkowski | |
| 6,929,431 B2 * | 8/2005 | Bergholt et al. | 408/143 |
| 7,204,662 B1 * | 4/2007 | Long et al. | 407/34 |
| 7,234,379 B2 | 6/2007 | Claesson et al. | |
| 2001/0041106 A1 * | 11/2001 | Nagaya et al. | 407/101 |
| 2002/0036091 A1 | 3/2002 | Claesson et al. | |
| 2002/0083805 A1 | 7/2002 | Lundblad | |
| 2003/0147707 A1 | 8/2003 | Perkowski | |
| 2005/0109182 A1 | 5/2005 | Murakami et al. | |
| 2007/0089574 A1 * | 4/2007 | Murakami et al. | 82/158 |

FOREIGN PATENT DOCUMENTS

| | | |
|---|---|---|
| JP | 59-129602 | 7/1984 |
| JP | 5-228707 A | 9/1993 |
| JP | 6-31505 A | 2/1994 |
| JP | 6-031507 | 2/1994 |
| JP | 2979823 | 9/1999 |
| JP | 2001-62612 A | 3/2001 |
| JP | 2001-96403 A | 4/2001 |
| JP | 2001-328022 A | 11/2001 |
| JP | 2003-62703 A | 3/2003 |
| JP | 2003-62735 A | 3/2003 |
| JP | 2003-136301 A | 5/2003 |
| WO | WO 02/20202 A1 | 3/2002 |
| WO | WO 02/045892 A1 | 6/2002 |

* cited by examiner

Direction of generated vibration

FIG. 7A
FIG. 7B
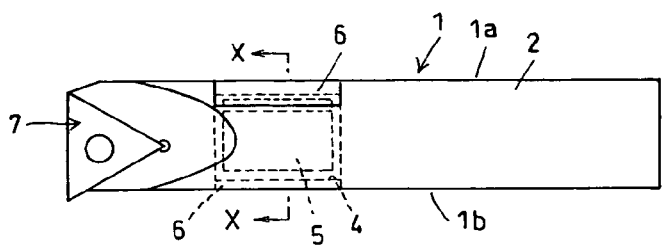
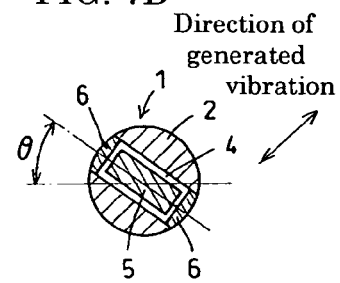
Direction of generated vibration
FIG. 8A
FIG. 8B
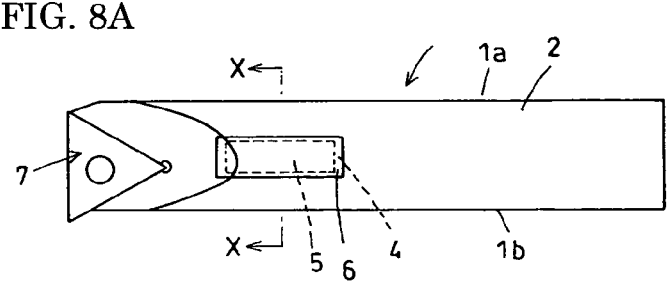
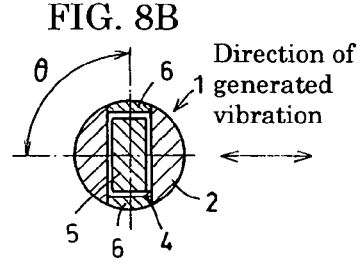
Direction of generated vibration
FIG. 9A
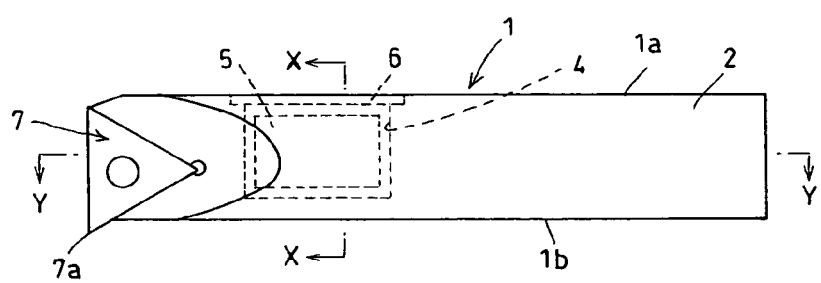
FIG. 9B
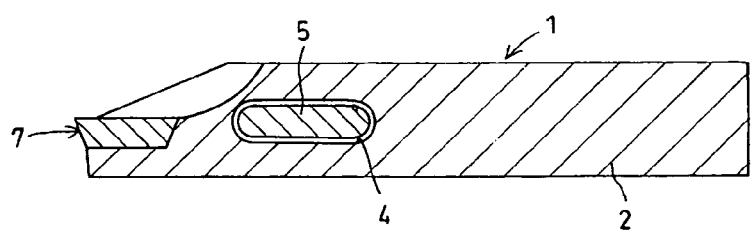
FIG. 9C
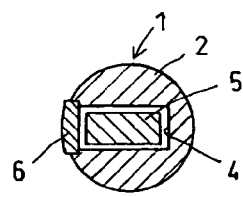

| | FIG. 10A | FIG. 10B | FIG. 10C | FIG. 10D |
|---|---|---|---|---|
| Configuration at Section X—X | | | | |
| * | 140 | 109 | 135 | 135 |

* Amount of deformation when the amount of deformation of an ordinary steel shank is expressed as "100"

FIG. 11

| | Pocket shape | | | Weight | |
|---|---|---|---|---|---|
| | b(mm) | h(mm) | h-a(mm) | Material | Specific gravity |
| Invented sample 1 | 8 | 3 | 0.1 | Cemented carbide | 15.1 |
| Invented sample 2 | 8 | 3 | 0.05 | Cemented carbide | 15.1 |
| Invented sample 3 | 8 | 3 | 0.15 | Heavy metal | 18.2 |
| Invented sample 4 | 8 | 3 | 0.15 | Steel | 7.8 |
| Invented sample 5 | 8 | 3 | 0.3 | Cemented carbide | 15.1 |
| Invented sample 6 | 8 | 3 | 0.5 | Cemented carbide | 15.1 |
| Comparative sample 1 | 3.5 | 3 | 0.15 | Cemented carbide | 15.1 |
| Comparative sample 2 | 8 | 3 | 0 | Cemented carbide | 15.1 |
| Comparative sample 3 | 8 | 3 | 1.5 | Cemented carbide | 15.1 |
| Comparative sample 4 | Holder having a shank made of steel | | | | |
| Comparative sample 5 | Holder having a shank made of cemented carbide | | | | |

| Amount of overhang (mm) | 48 | | 60 | | 72 | | 84 | |
|---|---|---|---|---|---|---|---|---|
| Cutting speed (m/min) | 80 | 160 | 80 | 160 | 80 | 160 | 80 | 160 |
| Invented sample 1 | ○ | ○ | ○ | ○ | ○ | ○ | ○ | ○ |
| Invented sample 2 | ○ | ○ | ○ | ○ | ○ | × | × | × |
| Invented sample 3 | ○ | ○ | ○ | ○ | ○ | ○ | ○ | ○ |
| Invented sample 4 | ○ | ○ | ○ | ○ | ○ | × | × | × |
| Invented sample 5 | ○ | ○ | ○ | ○ | ○ | ○ | ○ | ○ |
| Invented sample 6 | ○ | ○ | ○ | ○ | ○ | ○ | × | × |
| Comparative sample 1 | ○ | ○ | × | × | × | × | × | × |
| Comparative sample 2 | ○ | ○ | × | × | × | × | × | × |
| Comparative sample 3 | ○ | × | × | × | × | × | × | × |
| Comparative sample 4 | ○ | ○ | × | × | × | × | × | × |
| Comparative sample 5 | ○ | ○ | ○ | ○ | ○ | × | × | × |

VIBRATION-SUPPRESSING CUTTING TOOL

BACKGROUND OF THE INVENTION

1. Field of the Invention

The present invention relates to a low-cost vibration-suppressing cutting tool that can significantly reduce chatter vibrations mainly in cutting operations in which chatter vibrations cause problems.

2. Description of the Background Art

It has been well known that chatter vibrations can be suppressed by a method that uses inertia by incorporating a damper or similar member into a holder. In particular, in a boring bar for cutting an inside diameter, the size of the holder is limited by the hole diameter of a workpiece. Consequently, the amount of over-hang must be increased by using a slender shank. This structure tends to generate chatter vibrations. As a result, the prior art on the vibration-suppressing cutting tool mainly relates to a boring bar. Therefore, the following explanation is made by mainly referring to the boring bar as an example.

For example, the published Japanese patent application Tokukai 2003-136301 has disclosed the following method. As shown in FIGS. 5A and 5B, a hole 21 is drilled from the rear end of a shank portion 2 of the holder. A damper 22 is inserted into the hole 21 to place it at the tip portion of the holder near the cutting corner. A bar-shaped core 23 made of cemented carbide is inserted into the remaining portion of the hole 21. Another published Japanese patent application, Tokukaihei 6-31507, has disclosed a vibration-suppressing cutting tool in which a deep hole is formed at the center portion of the holder to house a weight.

As described above, an example of the conventional vibration-suppressing cutting tool has a deep hole drilled in a long holder to insert a damper so that it can be placed at the deepest portion of the hole. This structure increases the machining cost for producing an inside diameter-cutting holder, in particular, which has a long, small-diameter shank, because the hole must be drilled by using a gun drill or the like. Another example of the conventional vibration-suppressing cutting tool has a large hollow portion for inserting the weight of the damper. This structure decreases the stiffness of the holder. In addition, the complicated structure poses a problem of increasing the cost.

In addition, the complicated structure of these holders also poses the following problems: (a) the diameter of the shank of the holder is limited, and therefore the cutting diameter of the inside-diameter cutting is limited, and (b) the cutting condition to achieve the vibration-suppressing effect is limited.

SUMMARY OF THE INVENTION

An object of the present invention is to offer a vibration-suppressing cutting tool that can solve the above-described problems posed by conventional vibration-suppressing cutting tools and that is provided with a holder which is low-cost, which has an extremely high effect in suppressing chatter vibrations, which has a simple structure, and which is capable of adapting to a wide range of cutting diameter and cutting condition.

The present invention achieves the foregoing object by offering the following vibration-suppressing cutting tool. The tool comprises a holder comprising a shank portion provided with a pocket having the shape of a nearly rectangular solid. In the cross section of the shank, the pocket has a width of 50% to 100% of the shank diameter or the shank width and a height of 20% to 50% of the shank height. A weight is inserted into the pocket such that the weight is movable but unable to rush out. The weight has the shape of a nearly rectangular solid and is made of a material having a specific gravity comparable to or greater than that of the material of the shank portion.

In the vibration-suppressing cutting tool, the pocket may be formed such that:
  (a) it has a length of 50% to 250% of the shank diameter or the shank height; and
  (b) it is placed at a position relatively close to the tip of the tool.

The pocket may also be formed such that:
  (a) it is machined from the side of the holder; and
  (b) it is provided with a weight-holding means or sealing means for containing the weight in the pocket.

The pocket may also be formed such that:
  (a) it is machined from a side of the holder opposite to the side at which a cutting corner is placed; and
  (b) it forms a blind hole not passing through the side at which the cutting corner is placed.

The vibration-suppressing cutting tool may have the following structure:
  (a) the holder further comprises a head portion;
  (b) the shank portion and the head portion are separately formed;
  (c) the pocket has an opening at the tip of the shank portion;
  (d) the weight is inserted into the pocket; and
  (e) the head portion is bonded to the tip of the shank portion such that the head portion closes the opening of the pocket housing the weight.

According to one aspect of the present invention, the present invention offers the following vibration-suppressing cutting tool. The tool comprises a holder comprising a shank portion provided with a plurality of holes that extend along the width of the shank, that are placed along the longitudinal axis of the shank, and that are placed at a position relatively close to the tip of the shank portion. A weight having the shape of a bar is inserted into each of the holes such that the weight is movable but unable to rush out. The weight is made of a material having a specific gravity comparable to or greater than that of the material of the shank portion.

BRIEF DESCRIPTION OF THE DRAWINGS

In the drawings:

FIG. 7A is a plan view showing a tool in which the pocket of the tool shown in FIGS. 6A and 6B is slanted by an angle of θ degrees, and FIG. 7B is a cross-sectional view showing Section X-X in FIG. 7A.

FIG. 8A is a plan view showing a tool in which the pocket of the tool shown in FIGS. 6A and 6B is slanted by an angle of θ=90 degrees, and FIG. 8B is a cross-sectional view showing Section X-X in FIG. 8A.

FIG. 9A is a plan view showing yet another embodiment of the tool of the present invention, FIG. 9B is a longitudinal cross-sectional view showing Section Y-Y in FIG. 9A, and FIG. 9C is a cross-sectional view showing Section X-X in FIG. 9A.

FIGS. 10A to 10D compares the amount of deformation of the holder in various pocket configurations.

FIG. 11 shows design features of the tools used in an experiment to evaluate the effect.

DETAILED DESCRIPTION OF THE INVENTION

Figure 1A:
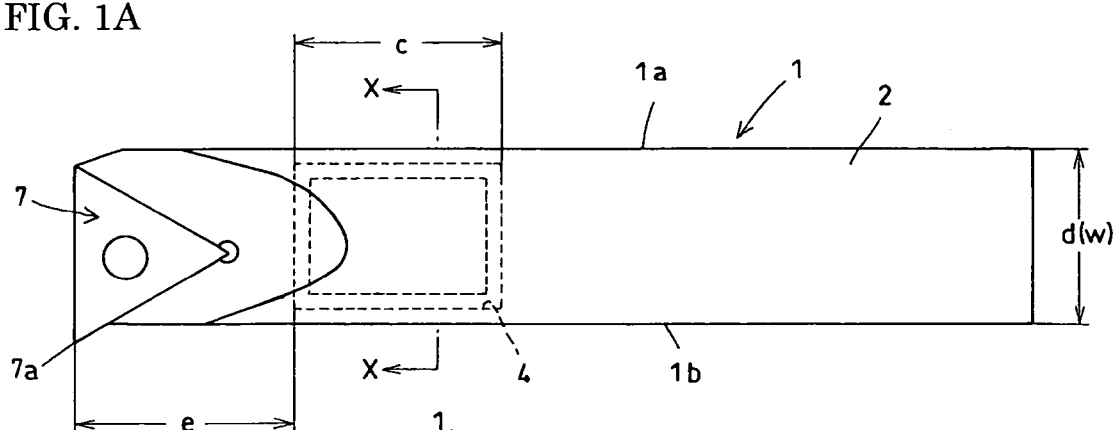
FIG. 1A is a plan view showing an embodiment of the tool of the present invention.
Figure 1B:
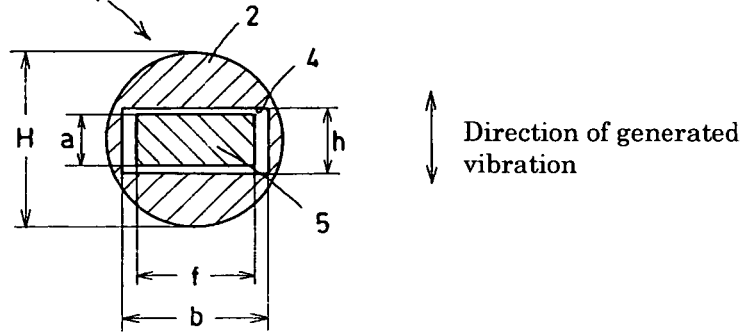
FIG. 1B is a cross-sectional view showing Section X-X in FIG. 1A.

According to the present invention, as shown in FIGS. 1A and 1B, a holder 1 has a shank portion 2 provided with a pocket 4 having the shape of a nearly rectangular solid. In the cross section of the shank, the pocket 4 has a width b of 50% to 100% of the shank diameter d or the shank width w and a height h of 20% to 50% of the shank height H. A weight 5 is inserted into the pocket 4 such that the weight is movable but unable to rush out. The weight 5 has the shape of a nearly rectangular solid and is made of a material having a specific gravity comparable to or greater than that of the material of the shank portion 2.

When the holder 1 is made of steel, which has a specific gravity of 7.8, it is desirable that the weight 5 be made of a material having a specific gravity of at least 7.8, such as cemented carbide or heavy metal.

Figure 2A:
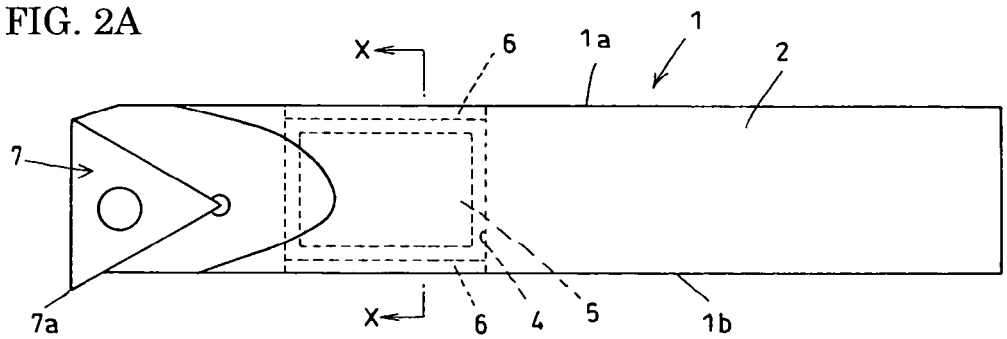
FIG. 2A is a plan view showing another embodiment of the tool of the present invention.
Figure 2B:
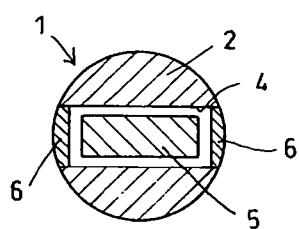
FIG. 2B is a cross-sectional view showing Section X-X in FIG. 2A.

The above-described vibration-suppressing cutting tool may have a structure shown in one of the following figures:

FIGS. 2A and 2B show a structure in which the pocket 4 in the shank portion 2 is machined from the side of the holder 1. The weight 5 inserted in the pocket 4 is contained in the pocket with a weight-holding means or a sealing means such as caps 6.

Figure 3A:
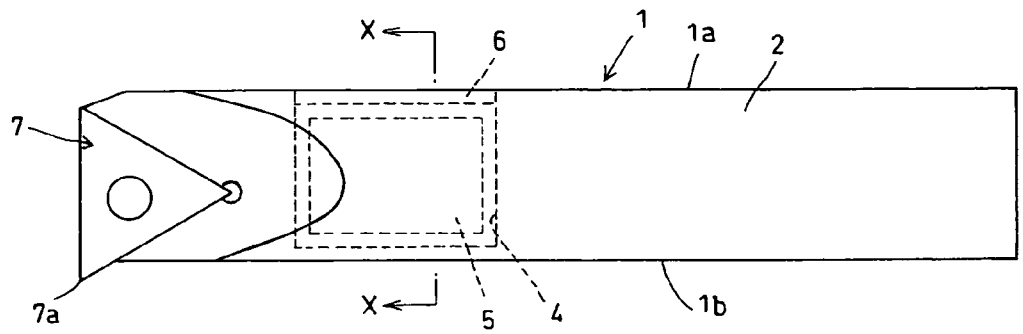
FIG. 3A is a plan view showing yet another embodiment of the tool of the present invention.
Figure 3B:
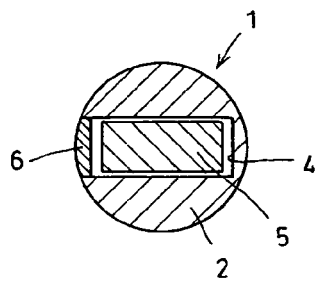
FIG. 3B is a cross-sectional view showing Section X-X in FIG. 3A.

FIGS. 3A and 3B show a structure in which the pocket 4 is machined from a side 1a of the holder opposite to the side at which a cutting corner 7a is placed. The pocket 4 forms a blind hole, which does not pass through a side 1b at which the cutting corner 7a is placed.

Figure 4A:
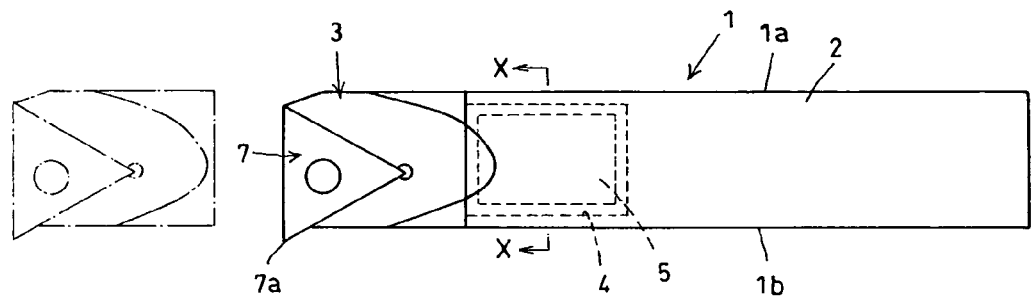
FIG. 4A is a plan view showing yet another embodiment of the tool of the present invention.
Figure 4B:
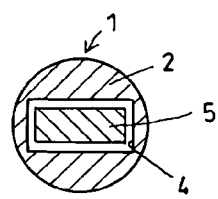
FIG. 4B is a cross-sectional view showing Section X-X in FIG. 4A.
Figure 5A:
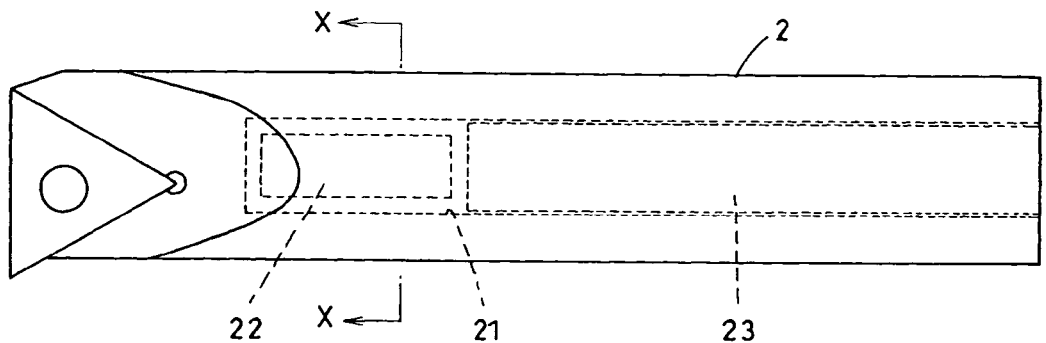
FIG. 5A is a plan view showing the basic structure of a conventional vibration-suppressing cutting tool.
Figure 5B:
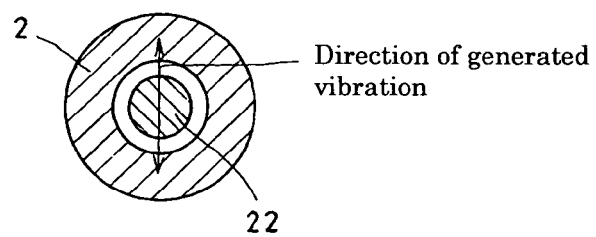
FIG. 5B is a cross-sectional view showing Section X-X in FIG. 5A.

FIGS. 4A and 4B show a structure in which the shank portion 2 and the head portion 3 of the holder 1 are separately formed. A weight 5 is inserted into a pocket 4 having an opening at the tip of the shank portion 2. Then, the head portion 3 is bonded to the tip of the shank portion 2 such that the head portion closes the opening of the pocket 4 at the tip.

It is desirable that the tool having any of the above-described structures have the following features (see FIGS. 1A and 1B):

(a) the pocket 4 for housing the weight has a length c of 50% to 250% of the shank diameter d or the shank height H;

(b) the pocket 4 is placed at a position relatively close to the tip of the tool; and (c) the distance e from the tip of the tool to the position of the pocket is 100% to 250% or so of the shank diameter d or the shank height H.

It is more desirable that the length c of the pocket 4 be 100% to 180% or so of the shank diameter d or the shank height H and that the distance e be 150% to 220% or so of the shank diameter d or the shank height H.

The present invention also offers another vibration-suppressing cutting tool having the following structure. A holder has a shank portion provided with a plurality of holes that extend along the width of the shank and that are placed along the longitudinal axis of the shank. The holes function as the above-described pocket. A weight having the shape of a bar is inserted into each of the holes such that the weight is movable but unable to rush out. The weight is made of a material having a specific gravity comparable to or greater than that of the material of the shank portion. It is desirable that in this tool also, the holes for housing the weights be placed at a position relatively close to the tip of the holder.

When the holder vibrates, the weight housed in the pocket vibrates due to the inertia, directly hitting the inside wall of the pocket. The vibration of the weight has a phase opposite to that of the holder. Therefore, the vibration of the holder is counteracted, and the chatter vibration is reduced. In particular, the present invention places the nearly-rectangular-solid weight in a direction more effective against the vibration by considering the direction of the vibration. The more effective direction is a direction at which the area of the weight making contact with the inside wall of the pocket is secured more widely. This arrangement enables the application of the load by the weight to the inside wall of the pocket with a wide distribution. This distributed application of the load is effective, so that the chatter vibration can be significantly reduced.

In addition, the structure of the present invention allows the machining of the pocket from the side of the holder. This machining method renders the production easier, reducing the production cost substantially. As a result, a vibration-suppressing cutting tool can be offered at a lower price.

A structure is described above in which the shank and head portions of the holder are separately formed to allow the weight to be inserted into the pocket, formed in the shank portion, from the tip of the shank portion. In this case, the weight most effective in suppressing the chatter vibration can be inserted. Consequently, this structure eliminates the need to machine a large damper-inserting portion. As a result, the structure can be simplified with minimizing the reduction in the stiffness of the shank due to the formation of the pocket. Finally, the cost of the tool (holder) can be reduced notably.

Another structure is described above in which a plurality of holes extending along the width of the shank are provided to house a bar-shaped weight in each of the holes under a movable condition. In this case, also, the chatter vibration can be suppressed effectively through the same action as described above. This type can further simplify the production, and therefore the cost can be further reduced.

The vibration-suppressing cutting tool of the present invention is further explained below by referring to various examples.

EXAMPLE 1

Figure 6A:
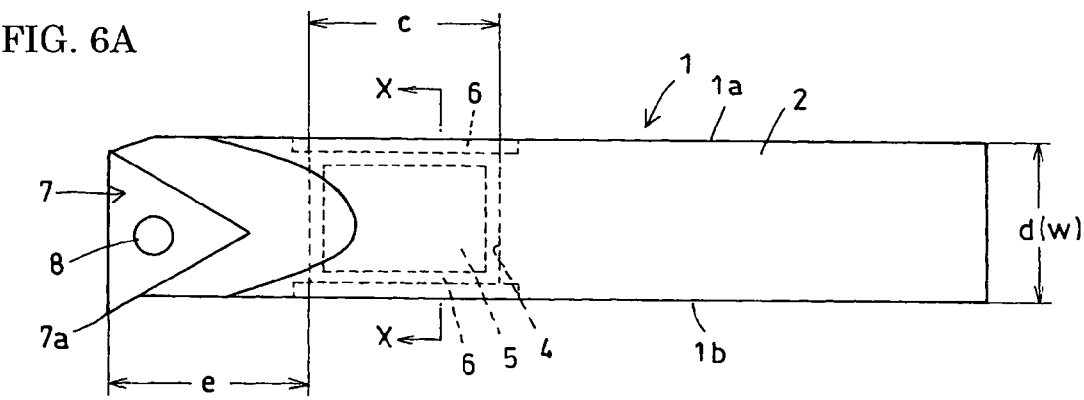
FIG. 6A is a plan view showing yet another embodiment of the tool of the present invention.
Figure 6B:
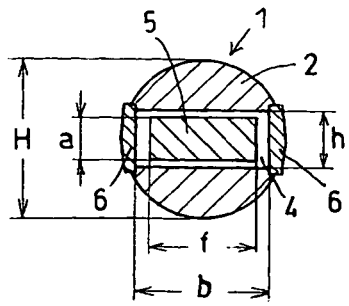
FIG. 6B is a cross-sectional view showing Section X-X in FIG. 6A.

FIGS. 6A and 6B show an embodiment of the vibration-suppressing cutting tool of the present invention. The tool shown is a boring bar having the following structure. An indexable insert 7 is clamped to the tip portion of a holder 1 with a clamping means 8 so that it can be easily attached and detached. A shank portion 2 of the holder 1 is provided with a hole passing through the shank from one side to the other. The hole is machined by a method such as electrical-discharge machining at a position relatively close to the tip of the holder 1. The hole acts as a pocket 4. A weight 5 made of cemented carbide having a specific gravity of 15.1 is inserted into the pocket 4. Both openings of the pocket 4 are closed with caps 6 so that the weight 5 is unable to rush out to the outside.

The weight 5 housed in the pocket 4 has a size (height a and width f) smaller than the size of the pocket by 0.15 mm or so. In other words, the weight 5 is allowed to move within the range of the clearance with the wall of the pocket 4.

It is absolutely necessary for the weight 5 to move in the pocket 4. If the interference of the wall of the pocket 4 prohibits the movement, the chatter vibration cannot be effectively suppressed. If the weight 5 is excessively small, because of the insufficient weight of the weight 5, sufficient effect in suppressing the chatter vibration cannot be achieved. A study by the present inventors has revealed that when the shank portion of the holder has a diameter as relatively small as 20 mm or less, the weight 5 smaller than the pocket 4 by 0.05 to 0.5 mm or so in size can have the effect. In particular, when the weight 5 is smaller than the pocket 4 by 0.1 to 0.3 mm or so, the effect is maximized. When the shank diameter is larger than 20 mm, even a larger clearance between the weight 5 and the pocket 4 can secure the weight 5 having a sufficient weight. More specifically, the weight 5 smaller than the pocket 4 by 0.5 mm or more can have the effect.

When the holder 1 is made of steel, which has a specific gravity of 7.8, the weight 5 is required to have a specific gravity of at least 7.8 to achieve a sufficient effect. The weight 5 having a higher specific gravity is advantageous because it allows the pocket to have a smaller size to achieve the same effect. Generally, a suitable material for the weight 5 is cemented carbide having a specific gravity of 14 to 16 or heavy metal having a specific gravity of 18 or so, because they are easily available and facilitate the machining. Of course, when a material having a specific gravity higher than that of these materials is available, it may be used.

If the pocket 4 is excessively large, the holder 1 decreases its stiffness, decreasing the machining precision of the tool (machined dimensions and surface roughness) or increasing the tendency of the chatter vibration of the tool, contrary to the object of the intention. If the pocket 4 is excessively small, the weight 5 becomes small accordingly, decreasing the effect of suppressing the chatter vibration. More specifically, if the pocket 4 is excessively small in the height h, the tool, such as an end mill, must have a small diameter to machine the pocket. This makes the machining difficult. In view of these limiting factors, it is desirable that the pocket 4 have a height h of 20% to 50% of the shank diameter d or the shank height H and a width b of 50% to 100% of the shank diameter d or the shank width w. The following result can be derived from the comprehensive judgment by considering the effect of preventing the chatter vibration, the degradation of the machining precision due to the bending of the holder at the time of machining, and the easiness in production. When the shank portion of the holder has a diameter as relatively small as 20 mm or less, it is most desirable that the pocket have a height h of 20% to 40% of the shank diameter d or the shank height H and a width b of 70% to 95% of the shank diameter d or the shank width w. The present inventors found that a good result can be achieved when the length c of the pocket 4 is 50% to 250% of the shank diameter d and the distance e from the tip of the tool to the position of the pocket is 100% to 250% of the shank diameter d. In particular, the most effective result was achieved when the length c of the pocket 4 was 100% to 180% or so of the shank diameter d and the distance e was 150% to 220% or so of the shank diameter d. When the shank diameter is larger than 20 mm, even a small pocket 4 can have a vibration-suppressing effect. More specifically, the effect can be achieved even when the pocket 4 has a width b as small as 50% or so of the shank diameter.

The positioning angle θ of the pocket 4 shown in FIGS. 7A and 7B may be determined in accordance with the direction at which the cutting force is applied. In an ordinary inside diameter-cutting tool, the pocket machined horizontally can sufficiently achieve the purpose of suppressing the chatter vibration. When the cutting is performed under a fixed condition at all times, the effect can be increased when the weight 5 is inserted into a pocket whose side constituting the width is perpendicular to the resultant force of the principal force and the back force of the cutting force. In a special cutting in which the back force is extremely high, the pocket 4 may be machined vertically, as shown in FIGS. 8A and 8B.

EXAMPLE 2

FIGS. 9A to 9C show an embodiment that is effective in the case where the machining precision is considered particularly important. The tool shown in FIGS. 6A and 6B can have a large weight, so that it can easily enhance the effect of suppressing the chatter vibration. However, because it has a pocket 4 passing through the shank portion 2, the stiffness of the holder tends to decrease, decreasing the machining precision. The vibration-suppressing cutting tool shown in FIGS. 9A to 9C can solve the problem.

In the tool shown in FIGS. 9A to 9C, a shank portion 2 is provided with a pocket 4 having the shape of a nearly rectangular solid. The pocket 4 is machined with an end mill from a side 1a of a holder 1 opposite to the side at which a cutting corner 7a is placed. To facilitate the machining with an end mill, both ends of the pocket 4 have the shape of an arc. To suppress the decrease in the stiffness of the holder 1, the pocket 4 forms a blind hole, which leaves a residual thickness of about 2 mm at a side 1b at which the cutting corner 7a is placed. As with Example 1, the opening of the pocket 4 at the side 1a is closed with a cap 6 so that the weight 5 is unable to rush out. The cap 6 may be made of the same steel as used for the holder 1. Nevertheless, when the cap 6 made of cemented carbide is securely attached to the holder 1, the reduction in the stiffness of the holder due to the formation of the pocket can be decreased.

As described above, the vibration-suppressing cutting tool shown in FIGS. 9A to 9C has a pocket 4 with the shape of a blind hole. This is an important point in enhancing the applicability of the tool further. The present inventors first produced the tool shown in FIGS. 6A and 6B and confirmed that it has a notably high effect in suppressing the chatter vibration. Although the structure shown in FIGS. 6A and 6B has a high effect in suppressing the chatter vibration, the reduction in the stiffness of the holder cannot be avoided. Consequently, there was apprehension that the machining precision degrades.

Accordingly, the present inventors studied the difference in stiffness between various types of structures including the one applying the structure of an H-beam, which is widely used as a building material. The result of the study is shown in FIGS. 10A to 10D. FIGS. 10A to 10D show a cross-sectional configuration at Section X-X of the holder shown in FIG. 1A. As can be seen from FIGS. 10A to 10D, in the structure shown in FIGS. 6A and 6B (see FIG. 10A), which forms the pocket 4 by a through hole, the amount of deformation due to a load is about 40% larger than that of the inside diameter-cutting tool having an ordinary steel shank without a vibration-suppressing mechanism. On the other hand, in the structure shown in FIGS. 9A to 9C (see FIG. 10B), the above-described increment in the deformation due to a load is suppressed to about 9%. In other words, this structure can decrease the reduction in the stiffness due to the formation of the pocket, stabilizing the machining precision. This effect cannot be achieved by other structures as can be seen form FIGS. 10A to 10D.

It is not impossible for the structure shown in FIGS. 9A to 9C to achieve an amount of deformation due to a load comparable to the amount for an ordinary steel shank having no hole when the cap 6 is formed with cemented carbide and securely fixed to the shank portion 2.

Figures 12, 13:
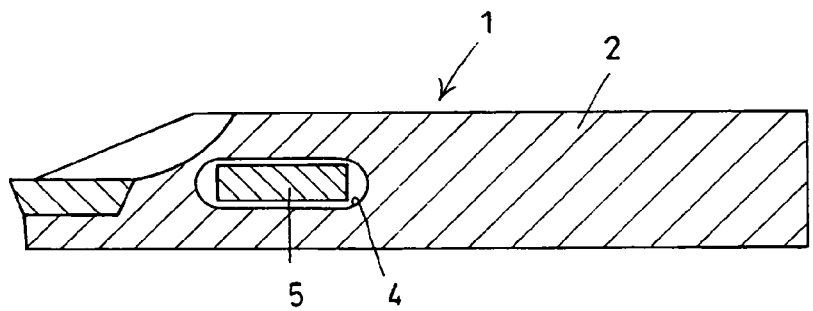
FIG. 12 shows the result of the experiment to evaluate the effect by using the tools shown in FIG. 11.
FIG. 13 is a longitudinal cross section showing a tool in which the weight shown in FIGS. 9A to 9C is replaced by another one having the shape of a rectangular solid.

When the pocket 4 has an arced shape at its both ends, the weight 5 to be inserted into the pocket may have the shape of a rectangular solid as shown in FIG. 13. Even when the weight has a flat face at its both ends, if the weight can have a sufficient weight, the weight having the shape shown in FIG. 13 is advantageous in that it can eliminate the machining of the arc-shaped face.

Next, the effect of suppressing the chatter vibration by the present invention was confirmed by the following cutting experiment. The tool produced for the experiment had a holder having the shape in accordance with the ISO Standard S12M-STUPR1103. The tool had the following dimensions (see FIGS. 1A and 1B):

Shank diameter d: 12 mm
Distance e from the tip of the tool to the position of the pocket: 21 mm
Pocket length c: 15 mm
Pocket width b: 8 mm
Pocket height h: 3 mm
Difference in width between the pocket and the weight (b–f): 0.1 mm
Residual thickness t shown in FIGS. 10B to 10D: 2 mm.

The cutting tools used for the experiment are shown in FIG. 11. They are Invented samples 1 to 6 and Comparative samples 1 to 5. Invented samples 1 to 6 and Comparative samples 1 and 3 were produced by varying the width of the pocket and the size and material of the weight. Comparative sample 2 was produced with no clearance between the weight and the pocket. Comparative sample 4 was produced by using a holder having an ordinary steel shank. Comparative sample 5 was produced by forming the shank with cemented carbide. Other tools than Comparative sample 5 had a shank made of steel.

The cutting experiment was conducted under the following conditions:

Workpiece: ordinary alloy steel SCR420
Cutting speed: 80 m/min and 160 m/min
Depth of cut: 0.2 mm
Feed per revolution: 0.1 mm/rev.

The experiment was conducted by varying the amount of overhang from the tool holding portion of the machine as follows: 48, 60, 72, and 84 mm. The result was evaluated on the basis of whether the chatter vibration was generated or not. The evaluation results are shown in FIG. 12. In FIG. 12, the sign "○" shows that no chatter vibration was generated, and the sign "X" shows that chatter vibrations were generated. As can be seen from the results, all Invented samples had a notably high effect in suppressing the chatter vibration. In particular, Invented samples 1, 3, and 5 showed a chatter vibration-suppressing effect superior to Comparative sample 5, which had a holder formed with cemented carbide. In addition, commercially available vibration-suppressing boring bars made by several companies were also subjected to the experiment under the same cutting conditions to compare the chatter vibration-suppressing effect. The result confirmed that all the commercially available samples generated a sound (a metallic sound during the cutting) due to the chatter vibration. In contrast, Invented samples only generated a slight sound at the early stage of the cutting, depending on the cutting condition, and they stopped generating the sound in a short time. After that, the cutting was performed nearly soundlessly. Some of Invented samples generated almost no sound from the beginning to the end. In this case, it was even difficult to notice whether the cutting was proceeding or not.

EXAMPLE 3

Figure 14A:
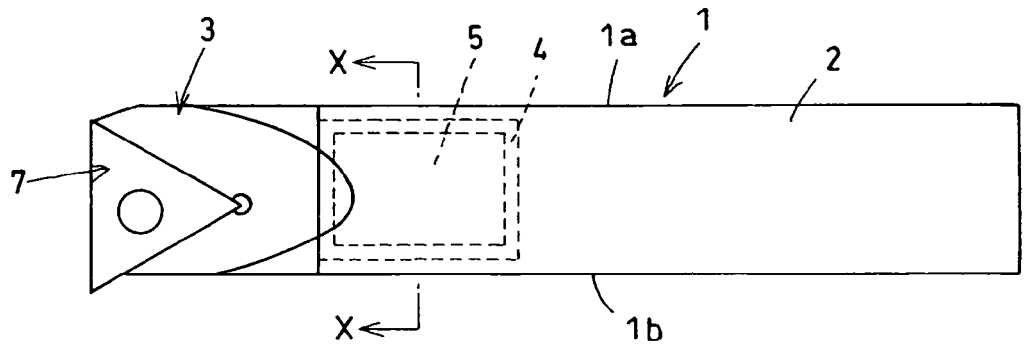
FIG. 14A is a plan view showing yet another embodiment of the tool of the present invention.
Figure 14B:
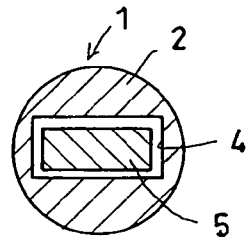
FIG. 14B is a cross-sectional view showing Section X-X in FIG. 14A.

FIGS. 14A and 14B show yet another embodiment. In the vibration-suppressing cutting tool shown in FIGS. 14A and 14B, a shank portion 2 and a head portion 3 of a holder 1 are first separately formed and then combined with each other to form an integrated body. The head portion 3 may either be bonded to the shank portion 2 unseparably or be attached to it separably so that the head portion 3 can be replaced when it is broken.

This structure allows the formation of a pocket 4 having an opening at the tip of the shank portion 2 so that a weight 5 can be inserted into it. In this case, the head portion 3 acts as a cap, eliminating the need to provide a specific cap. When the shank portion 2 is formed with cemented carbide and a pocket 4 is formed through such a method as electrical-discharge machining, an inside diameter-cutting vibration-suppressing cutting tool can be obtained that has high stiffness and an extremely high effect in suppressing the chatter vibration.

EXAMPLE 4

Figure 15A:
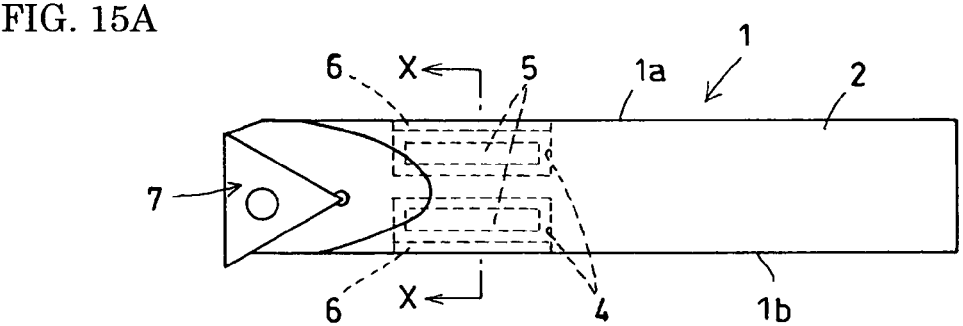
FIG. 15A is a plan view showing yet another embodiment of the tool of the present invention.
Figure 15B:
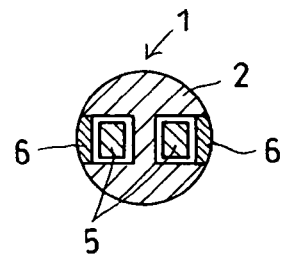
FIG. 15B is a cross-sectional view showing Section X-X in FIG. 15A.

FIGS. 15A and 15B show yet another embodiment, in which pockets 4 are machined from both sides of a holder 1 so that the central solid portion of the shank can be left intact. This structure houses weights 5 smaller than those housed in other structures described above. As a result, the effect of suppressing the chatter vibration decreases slightly. Nevertheless, this structure allows the formation of a longitudinally extending oil hole at the central solid portion between the two pockets. This oil hole can be used to supply a cutting fluid effectively to the cutting corner.

EXAMPLE 5

Figure 16:
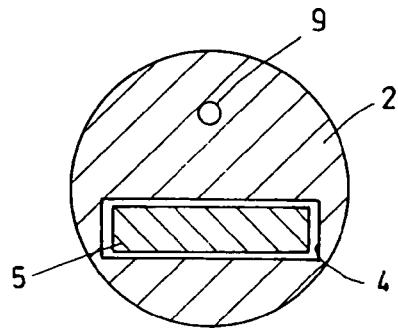
FIG. 16 is a cross-sectional view showing yet another embodiment of the tool of the present invention in which an off-center pocket is formed in the shank.

FIG. 16 shows a vibration-suppressing cutting tool in which a pocket 4 is provided off center in a shank portion 2 downwardly ("upwardly" is also possible). This structure also allows the formation of an oil hole 9 in the remaining solid portion above the pocket 4.

EXAMPLE 6

Figure 17A:
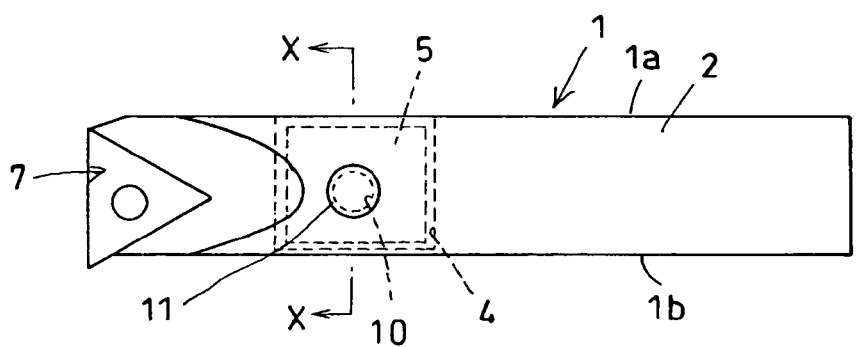
FIG. 17A is a plan view showing yet another embodiment of the tool of the present invention.
Figure 17B:
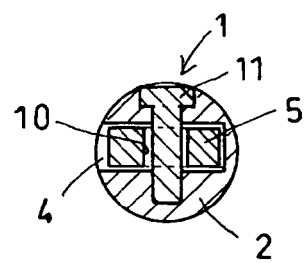
FIG. 17B is a cross-sectional view showing Section X-X in FIG. 17A.

FIGS. 17A and 17B show another method for preventing a weight 5 from rushing out from a pocket 4. As shown in FIGS. 17A and 17B, the weight 5 is provided with a hole 10 that passes through the weight 5 from the bottom to the top. A holding pin 11 thinner than the diameter of the hole 10 is inserted into it to prevent the weight 5 from rushing out. No cap is required in this structure.

EXAMPLE 7

Figure 18:
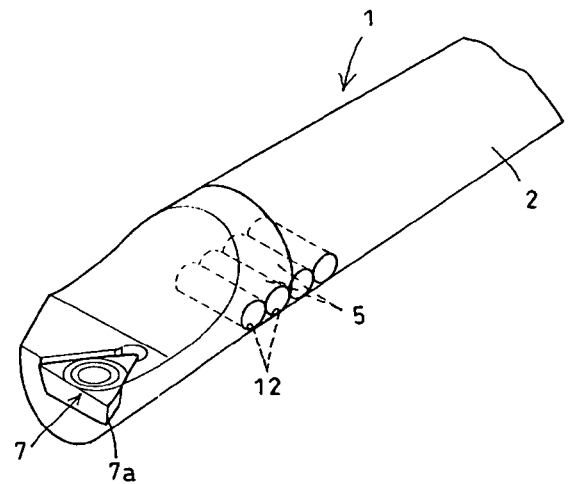
FIG. 18 is a perspective view showing yet another embodiment of the tool of the present invention.

FIG. 18 shows yet another vibration-suppressing cutting tool. A plurality of holes 12 extending along the width of the shank portion 2 are placed along the longitudinal axis of the shank (the holes may be either through holes or blind holes). The holes 12 are placed at a position relatively close to the tip of the shank. A weight 5 is inserted into each of the holes 12 such that the weight is movable but unable to rush out from the hole. This structure inevitably uses a small weight. Consequently, the chatter vibration-suppressing effect is lower than that of the above-described structures. However, it can easily suppress the reduction in the stiffness of the holder. When the holes 12 are round holes and the weights 5 are round bars, this type can further simplify the production of the holder, reducing the production cost.

The above explanation is made by referring to an inside diameter-cutting tool, which is represented by a boring bar, as an example. Nevertheless, the present invention can also be applied to a cutting tool for grooving, a cutting tool for threading, and a general cutting tool for outside-diameter turning work, all of which tend to generate chatter vibrations. The present invention is not limited to the turning work. It can also be applied to a tool such as a boring quill to be attached to a milling machine, a machining center, and the like. In this case also, an excellent chatter vibration-suppressing effect can be achieved.

What is claimed is:

1. A vibration-suppressing cutting tool, comprising a holder comprising a shank portion provided with a pocket having the shape of a nearly rectangular solid, in the cross section of the shank portion, the pocket having a width of 50% to approaching 100% of the shank diameter or the shank width and a height of 20% to 50% of the shank height; and a weight being inserted into, and movable relative to, the pocket, the weight having the shape of a nearly rectangular solid and being made of a material having a specific gravity comparable to or greater than that of the material of the shank portion, wherein the pocket has first and second flat surfaces opposing each other, the first and second flat surfaces being both parallel to the longitudinal axis of the shank and being perpendicular to a direction of vibration of the holder.

2. A vibration-suppressing cutting tool as defined by claim 1, wherein:
   (a) the pocket has a length of 50% to 250% of the shank diameter or the shank height; and
   (b) the pocket is placed at a position relatively close to the tip of the tool.

3. A vibration-suppressing cutting tool as defined by claim 2, wherein:
   (a) the pocket is machined from the side of the holder; and
   (b) the pocket is provided with a weight-holding means or sealing means for containing the weight in the pocket.

4. A vibration-suppressing cutting tool as defined by claim 3, wherein:
   (a) the pocket is machined from a side of the holder opposite to the side at which a cutting corner is placed; and
   (b) the pocket forms a blind hole not passing through the side at which the cutting corner is placed.

5. A vibration-suppressing cutting tool as defined by claim 2, wherein:
   (a) the holder further comprises a head portion;
   (b) the shank portion and the head portion are separately formed;
   (c) the pocket has an opening at the tip of the shank portion;
   (d) the weight is inserted into the pocket; and
   (e) the head portion is bonded to the tip of the shank portion such that the head portion closes the opening of the pocket housing the weight.

6. A vibration-suppressing cutting tool as defined by claim 1, wherein:
   (a) the pocket is machined from the side of the holder; and
   (b) the pocket is provided with a weight-holding means or sealing means for containing the weight in the pocket.

7. A vibration-suppressing cutting tool as defined by claim 6, wherein:
   (a) the pocket is machined from a side of the holder opposite to the side at which a cutting corner is placed; and
   (b) the pocket forms a blind hole not passing through the side at which the cutting corner is placed.

8. A vibration-suppressing cutting tool as defined by claim 1, wherein:
   (a) the holder further comprises a head portion;
   (b) the shank portion and the head portion are separately formed;
   (c) the pocket has an opening at the tip of the shank portion;
   (d) the weight is inserted into the pocket; and
   (e) the head portion is bonded to the tip of the shank portion such that the head portion closes the opening of the pocket housing the weight.

* * * * *